T. W. STRINGHAM.
DISTRIBUTER FOR LIQUIDS.
APPLICATION FILED JAN. 5, 1916.
1,203,935.
Patented Nov. 7, 1916.
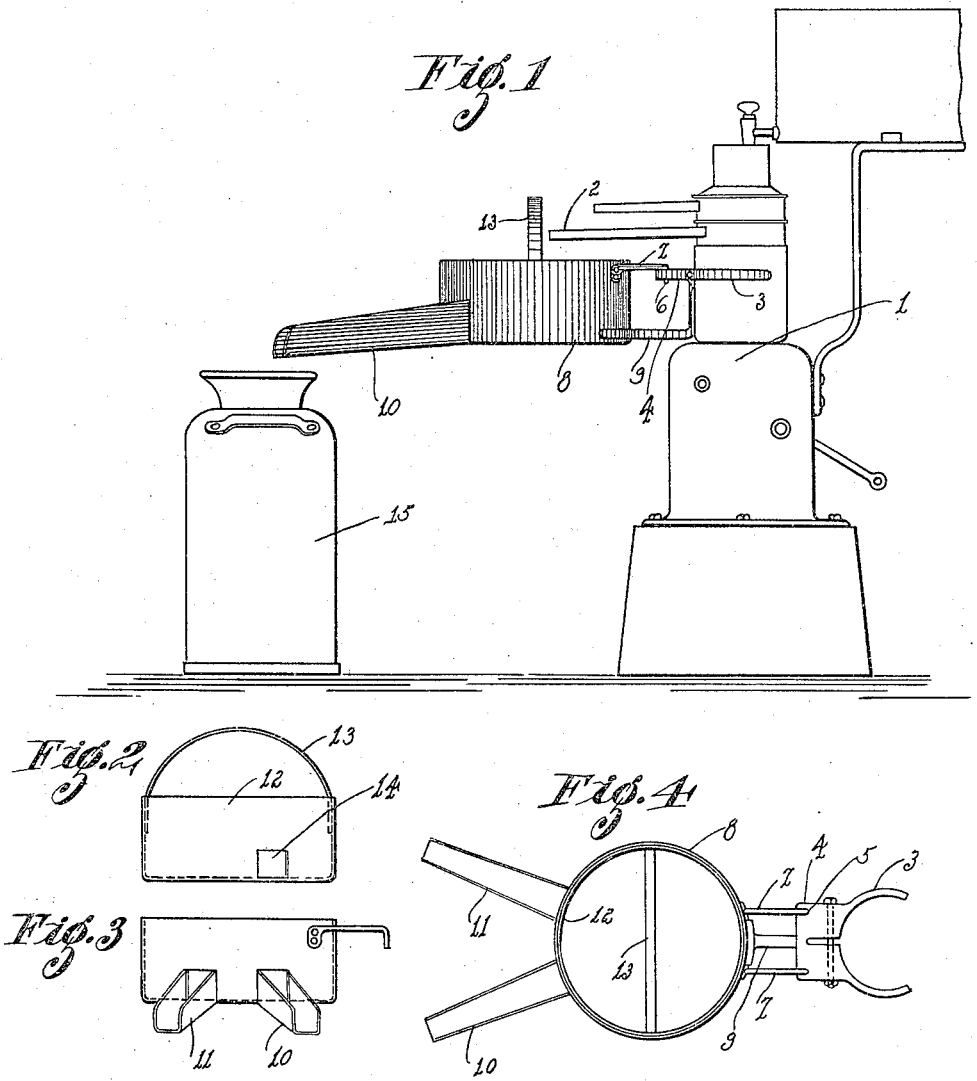
WITNESS.
Floyd M. Blanchard
INVENTOR.
Thomas W. Stringham
BY
ATTORNEY.

UNITED STATES PATENT OFFICE.

THOMAS W. STRINGHAM, OF LODI, CALIFORNIA.

DISTRIBUTER FOR LIQUIDS.

1,203,935. Specification of Letters Patent. Patented Nov. 7, 1916.

Application filed January 5, 1916. Serial No. 70,389.

*To all whom it may concern:*

Be it known that I, THOMAS W. STRINGHAM, a citizen of the United States, residing at Lodi, in the county of San Joaquin, State of California, have invented certain new and useful Improvements in Distributers for Liquids; and I do declare the following to be a full, clear, and exact description of the same, reference being had to the accompanying drawings, and to the characters of reference marked thereon, which form a part of this application.

This invention relates to improvements in a means for the distribution of liquids and is particularly designed in connection with the distribution of skimmed milk passing from the separator whereby the same can be continuously delivered into the cans for use in feeding calves or other stock without the necessity of shutting off the flow of the said skimmed milk as it comes from the separator. This object I accomplish by means of a changeable valve structure which can be fastened to the separator and used for distributing the milk first into one can and then in the other without stopping the flow.

A further object of the invention is to produce a simple and inexpensive device and yet one which will be exceedingly effective for the purposes for which it is designed.

These objects I accomplish by means of such structures and relative arrangement of parts as will fully appear by a perusal of the following specification and claims.

In the drawings similar characters of reference indicate corresponding parts in the several views.

Figure 1 is a side elevation of the complete device. Fig. 2 is a front elevation of the interior shell of the distributer. Fig. 3 is a front elevation of the exterior shell of the distributer. Fig. 4 is a top plan view of the distributer.

Referring now more particularly to the characters of reference on the drawings the numeral 1 designates the separator having a discharge outlet 2 from which is discharged the skimmed milk.

My improved invention comprises primarily a bracket having a clamp 3 arranged to frictionally engage with the body of the separator 1, such clamp having a projecting support 4 provided with holes 5 adapted to receive hooks 6 on projecting arms 7 from the outer shell 8 of the distributing receptacle. On the bracket 3 is also a projecting arm 9 arranged to brace the said receptacle 8. Said receptacle 8 has two discharge spouts 10 and 11 extending in opposite directions with respect to each other.

The numeral 12 designates the interior shell of the distributing receptacle which fits snugly into the receptacle 8 and is provided with a handle 13 for removing the same or for turning it within said shell 8. Such shell 12 is provided with an opening 14 arranged to be brought into register with the spouts 10 or 11 as the shell 12 is turned within the shell 8. Also such opening 14 can be kept out of register with either of the spouts 10 or 11.

In practice the skimmed milk is delivered from the separator into the inner shell 12. By moving the shell 12 to bring the opening 14 into register with the spout 10 the skimmed milk may be delivered through the said spout 10 into the can 15. When the can 15 is full another can may be placed under the spout 11 and shell 12 moved to bring the opening 14 into register with the spout 11 and shut off the spout 10. The can 15 may then be taken away and emptied and another placed under the spout 10 and so on; and vice versa when the can under the spout 11 is filled it may be emptied and another placed under the spout 11.

From the foregoing description it can readily be seen that the skimmed milk can be distributed without waste. Also from the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. The combination with a separator, a bracket mounted on the separator and having a projecting plate provided with openings, a receptacle having projecting arms, having hooks engageable with said openings, a plurality of discharge spouts on said receptacle, and another receptacle turnable within the first named receptacle and having an opening arranged to be brought into register with each of said spouts, as described.

2. The combination with a separator, of a receptacle removably supported on the separator and provided with a plurality of discharge outlets, another receptacle turnable within the first named receptacle and having an opening arranged to be brought into register with each of the said discharge outlets, the second named receptacle being removable from the first named receptacle, and a projecting handle on the second named receptacle for the purpose of turning or removing same, as described.

In testimony whereof I affix my signature.

THOMAS W. STRINGHAM.

Copies of this patent may be obtained for five cents each, by addressing the "Commissioner of Patents, Washington, D. C."